US010742690B2

(12) United States Patent
Miriyala et al.

(10) Patent No.: US 10,742,690 B2
(45) Date of Patent: Aug. 11, 2020

(54) SCALABLE POLICY MANAGEMENT FOR VIRTUAL NETWORKS

(71) Applicant: Juniper Networks, Inc., Sunnyvale, CA (US)

(72) Inventors: Prasad Miriyala, San Jose, CA (US); Anish Mehta, Fremont, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 119 days.

(21) Appl. No.: 15/819,522

(22) Filed: Nov. 21, 2017

(65) Prior Publication Data

US 2019/0158541 A1    May 23, 2019

(51) Int. Cl.
*H04L 29/06* (2006.01)
*H04L 29/08* (2006.01)

(52) U.S. Cl.
CPC ........ *H04L 63/205* (2013.01); *H04L 63/0263* (2013.01); *H04L 67/10* (2013.01)

(58) Field of Classification Search
None
See application file for complete search history.

(56) References Cited

U.S. PATENT DOCUMENTS

| | | |
|---|---|---|
| 6,292,900 B1 | 9/2001 | Ngo et al. |
| 7,516,475 B1 | 4/2009 | Chen et al. |
| 7,546,629 B2 | 6/2009 | Albert et al. |
| 7,860,006 B1 | 12/2010 | Kashyap et al. |
| 8,099,774 B2 | 1/2012 | Abzarian et al. |
| 8,301,746 B2 | 10/2012 | Head et al. |
| 9,680,875 B2 | 6/2017 | Knjazihhin et al. |
| 2005/0180398 A1 | 8/2005 | Deno et al. |
| 2006/0022816 A1 | 2/2006 | Yukawa |
| 2006/0075198 A1 | 4/2006 | Susaki et al. |
| 2007/0169186 A1 | 7/2007 | Ueoka et al. |
| 2009/0070268 A1 | 3/2009 | Sarkissian et al. |
| 2011/0055367 A1 | 3/2011 | Dollar |

(Continued)

FOREIGN PATENT DOCUMENTS

| | | |
|---|---|---|
| WO | 2013/184846 A1 | 12/2013 |
| WO | 2017/064560 A1 | 4/2017 |

OTHER PUBLICATIONS

Sangli et al., "BGP Extended Communities Attribute," RFC 4360, Network Working Group, Feb. 2006, 12 pp.

(Continued)

*Primary Examiner* — Henry Tsang
(74) *Attorney, Agent, or Firm* — Shumaker & Sieffert, P.A.

(57) ABSTRACT

Techniques are disclosed for implementing scalable policies across a plurality of categories that support application workloads. In one example, a policy controller assigns to the plurality of categories tags specifying one or more of a plurality of dimensions. The policy controller distributes a plurality of policies to policy agents for the plurality of categories. Each policy includes one or more policy rules, and each policy rule includes one or more tags specifying one or more of the plurality of dimensions. For each policy rule, the policy agents allow or deny a traffic flow between objects that belong to categories of the plurality of categories described by the one or more dimensions of a respective tag of the policy rule.

31 Claims, 6 Drawing Sheets

(56) References Cited

U.S. PATENT DOCUMENTS

| | | | | |
|---|---|---|---|---|
| 2012/0005724 | A1* | 1/2012 | Lee | H04L 63/0209 726/1 |
| 2013/0182722 | A1 | 7/2013 | Vishveswaraiah et al. | |
| 2014/0033268 | A1* | 1/2014 | Julisch | H04L 63/20 726/1 |
| 2014/0245423 | A1* | 8/2014 | Lee | H04L 63/0218 726/12 |
| 2015/0081893 | A1 | 3/2015 | Chadwell et al. | |
| 2015/0124809 | A1 | 5/2015 | Edsall et al. | |
| 2016/0055354 | A1 | 2/2016 | Jinaraj et al. | |
| 2016/0261486 | A1* | 9/2016 | Fang | H04L 45/04 |
| 2018/0109450 | A1* | 4/2018 | Filsfils | H04L 45/74 |
| 2018/0316729 | A1 | 11/2018 | Chauvet et al. | |
| 2019/0014124 | A1* | 1/2019 | Reddy | H04L 63/108 |
| 2019/0068690 | A1 | 2/2019 | Canton et al. | |
| 2019/0158541 | A1 | 5/2019 | Miriyala et al. | |

OTHER PUBLICATIONS

Sajassi et al., "BGP MPLS-Based Ethernet VPN," RFC 7432, Internet Engineering Task Force (IETF), Feb. 2015, 56 pp.

"Juniper / Contrail-specs / fw_security_enhancements.md," GitHub, May 20, 2017, accessed from https://github.com/Juniper/contrail-specs/blob/master/fw_security_enhancements_md, 10 pp.

"Service group and Service Object support," OpenStack Neutron Team, OpenStack Cloud Software, last updated Mar. 17, 2015, accessed from http://specs.openstack.org/openstack/neutron-specs/specs/kilo/service-group.html, 7 pp.

"Firewall as a Service API 2.0," OpenStack Neutron Team, OpenStack Cloud Software, last updated Sep. 21, 2017, accessed from https://specs.openstack.org/openstack/neutron-specs/specs/newton/fwaas-api-2.0.html, 31 pp.

"3.2 Rules Headers," SNORTUsers Manual 2.9.11, Applicant points out, in accordance with MPEP 609.04(a), that the year of publication, 2008, is sufficiently earlier than the effective U.S. filing date, 2017, so that the particular month of publication is not an issue, accessed from http://manual-snort-org.s3-website-us-east-1.amazonaws.com/node29.html#SECTION00421000000000000000, 4 pp.

U.S. Appl. No. 16/355,289, filed Mar. 15, 2019 entitled "Storage Volume Replication Across Multiple Data Centers", Juniper Networks, Inc. (inventor: Echegaray et al.).

U.S. Appl. No. 16/118,107, filed Aug. 30, 2018 entitled "Multiple Virtual Network Interface Support for Virtual Execution Elements", Juniper Networks, Inc. (inventor:Rao et al.).

Nutanix, Apr. 9, 2019, available at https://www.nutanix.com/blog/building-things-people-like (last accessed Aug. 22, 2019), 4 pp.

"ClearSky Takes Primary Storage 'to the Cloud'" A DeepStorage Technology Validation Report, DeepStorage, LLC Aug. 31, 2015, 15 pp.

"Container Orchestration Services" Mesosphere, Mar. 24, 2016, available at www.mesosphere.com > solutions > container-orchestration (last accessed Aug. 22, 2019), 7 pp.

"Run Kubernetes Everywhere" Container Orchestration, Kubernetes Management, Rancher.com (last accessed Aug. 22, 2019), May 1, 2019, 10 pp.

"Federation" The Kubernetes Authors, Mar. 12, 2019, available at https://kubernetes.io/docs/tasks/federation/ {last accessed Aug. 22, 2019) 7 pp.

"Hyper-Converged Kubernetes Architecture: ROBIN—Databases, Big Data" ROBIN, May 28, 2019, available at https://robin.io/product/architecture/ (last accessed Aug. 22, 2019), 4 pp.

"Hyperconverged Kubernetes" White Paper, ROBIN, Jan. 28, 2019, available at https://robin.io/portfolio/hyperconverged-kubernetes-whitepaper/ (last accessed Aug. 22, 2019), 15 pp.

Callahan, "Introducing the Zenko Multi-Cloud Data Controller—Scality" Scality, Jul. 12, 2017, available at https://www.scality.com/introducing-zenko-multi-cloud-data-controller/ (last accessed Aug. 22, 2019), 10 pp.

Rehman et al. "Kubernetes Federation Evolution" The Kubernetes Authors, Dec. 12, 2018, available at https://kubernetes.io/blog/2018/12/12/kubernetes-federation-evolution/(last accessed Aug. 22, 2019), 8 pp.

Hözle et al. "Introducing Anthos: An entirely new platform for managing applications in today's multi-cloud world" Google, Inc., Apr. 9, 2019, available at https://cloud.google.com/blog/topics/hybrid-cloud/new-platform-for-managing-applications-in-todays-multi-cloud-world, (last accessed Aug. 22, 2019), 2 pp.

"Marathon Placement Constraints" Mesosphere DC/OS Documentation, Mesosphere, Oct. 25, 2018, available at https://docs.d2iq.com/mesosphere/dcos/1.12/deploying-services/marathon-constraints/ (last accessed Aug. 22, 2019), 2 pp.

"Multi-Cloud" NooBaa, Apr. 28, 2018, available at https://www.noobaa.io/multicloud (last accessed Aug. 22, 2019), 7 pp.

"OpenStack Docs: Placement Usage" The OpenStack Project, Mar. 18, 2019, available at https://docs.openstack.org/placement/latest/usage/index.html (last accessed Aug. 22, 2019), 3 pp.

"OpenStack Docs: Stein Series Release Notes" The OpenStack Project, Apr. 11, 2019, available at https://docs.openstack.org/releasenotes/placement/stein.html# (last accessed Aug. 22, 2019), 4 pp.

"OpenStack Stein—OpenStack is open source software for creating private and public clouds." The OpenStack Project, Apr. 10, 2019, available at https://www.openstack.org/software/stein/ (last accessed Aug. 22, 2019), 34 pp.

"Portworx features & pricing: Container storage, HA, security" The Portworx Platform, Dec. 5, 2018, available at https://portworx.com/products/features/ (last accessed Aug. 22, 2019), 8 pp.

Meyer, "Red Hat Squeezes OpenStack, OpenShift Closer Together" SDxCentral, Nov. 13, 2018, available at https://www.sdxcentral.com/articles/news/red-hat-squeezes-openstack-openshift-closer-together/2018/11/ (last accessed Aug. 22, 2019), 3 pp.

"REX-Ray" REX-Ray, Apr. 23, 2018, available at https://rexray.io (last accessed Aug. 22, 2019), 12 pp.

"Openly serious about storage" REX-Ray, Feb. 28, 2018, available at https://rexray.readthedocs.io/en/stable/ (last accessed Aug. 22, 2019), 5 pp.

"Open-Source, Cloud-Native Storage for Kubernetes" Rook Authors, Jun. 27, 2017, available at https://rook.io (last accessed Aug. 22, 2019), 6 pp.

"Scality RING Multi-Cloud Data Storage at Petabyte Scale" Scality Ring 7.4 Data Sheet, Scality, Jun. 5, 2018, 4 pp.

"What is Multi Cloud?" Scaility, Dec. 2, 2017, available at https://www.scality.com/topics/what-is-multi-cloud/ (last accessed Aug. 22, 2019), 10 pp.

Office Action from U.S. Appl. No. 16/024,412, dated Aug. 30, 2019, 8 pp.

Response to Office Action dated Jul. 8, 2019, from U.S. Appl. No. 16/024,306, 13 pp.

Droms, R. "Dynamic Host Configuration Protocol" Network Working Group, RFC 2131, Mar. 1997, 45 pp.

Enns et al. "Network Configuration Protocol (NETCONF)" Internet Engineering Task Force (IETF), RFC 6241, Jun. 2011, 113 pp.

Mockapetris, P. "Domain Names—Concepts and Facilities" Network Working Group, RFC 1034, Nov. 1987, 55 pp.

Mockapetris, P. "Domain Names—Implementation and Specification" Network Working Group, RFC 1035, Nov. 1987, 55 pp.

U.S. Appl. No. 15/476,136, Juniper Networks, Inc. (inventor: Mehta et al.), entitled "Session-Based Traffic Statistics Logging for Virtual Routers", filed Mar. 31, 2017.

Notice of Allowance from U.S. Appl. No. 16/023,978, dated Mar. 5, 2020, 20 pages.

Office Action from U.S. Appl. No. 16/024,306, dated Jul. 8, 2019, 14 pp.

Final Office Action from U.S. Appl. No. 16/024,306, dated Dec. 18, 2019, 15 pp.

Response to Office Action dated Dec. 18, 2019, from U.S. Appl. No. 16/024,306, filed Feb. 18, 2020, 6 pp.

Notice of Allowance from U.S. Appl. No. 16/024,306 dated Mar. 30, 2020, 5 pp.

(56) References Cited

OTHER PUBLICATIONS

Notice of Allowance from U.S. Appl. No. 16/023,978, dated May 14, 2020, 8 pp.

* cited by examiner

SCALABLE POLICY MANAGEMENT FOR VIRTUAL NETWORKS

TECHNICAL FIELD

This disclosure generally relates to computer networks, and more specifically, to distributed applications.

BACKGROUND

Virtualized data centers are becoming a core foundation of the modern information technology (IT) infrastructure. In particular, modern data centers have extensively utilized virtualized environments in which virtual hosts, such virtual machines or containers, are deployed and executed on an underlying compute platform of physical computing devices.

Virtualization with large scale data center can provide several advantages. One advantage is that virtualization can provide significant improvements to efficiency. As the underlying physical computing devices (i.e., servers) have become increasingly powerful with the advent of multicore microprocessor architectures with a large number of cores per physical CPU, virtualization becomes easier and more efficient. A second advantage is that virtualization provides significant control over the infrastructure. As physical computing resources become fungible resources, such as in a cloud-based computing environment, provisioning and management of the compute infrastructure becomes easier. Thus, enterprise IT staff often prefer virtualized compute clusters in data centers for their management advantages in addition to the efficiency and increased return on investment (ROI) that virtualization provides.

SUMMARY

In general, the disclosure describes techniques for a scalable, multi-dimensional policy framework to support flexible application of policies for controlling network traffic among workloads executing within a computing environment and that may be categorized along a number of different dimensions. Such categories may include applications, deployments, application tiers, geographic sites, virtual networks, virtual machines, interfaces, projects, security requirements, quality requirements, users, or compliance requirements, for example. Each type of such category represents a dimension for workloads that generate or consume network traffic. In some examples, the policy framework described herein permits the administrator to tag objects that execute or otherwise enable workloads with specific dimensions across multiple levels. Example levels of such objects include a global environment level, a project level, a virtual network level, a virtual machine level, and an interface level. In one example, tags map security requirements for the objects. Policies may then be expressed along multiple dimensions in terms of tags corresponding to categories to which the tagged objects belong. Distributed policy agents executing on computing devices that host the workloads may then apply the policies to tagged objects that are members of categories to allow or deny a traffic flow between the tagged objects tagged with one or more categories for one or more dimensions. At least in some cases, the policy agents apply the policies at the interface level. In this way, a user or administrator may define simplified traffic policies that are scalable and robust across many different types of deployments and execution environments.

In one example, this disclosure describes a method comprising: assigning, by a policy controller and to a plurality of categories that support application workloads, tags specifying one or more dimensions of a plurality of dimensions for the application workloads, wherein the application workloads are executed by one or more computing devices, and wherein the one or more computing devices include the plurality of categories; and distributing, by the policy controller and to respective policy agents of the one or more computing devices, a plurality of policies, wherein each policy of the plurality of policies includes one or more policy rules, wherein each policy rule of the one or more policy rules specifies one or more tags specifying one or more dimensions of the plurality of dimensions, and wherein each policy rule of the one or more policy rules causes the respective policy agents to allow or deny a traffic flow between objects that belong to categories of the plurality of categories described by the one or more dimensions of a tag of the policy rule.

In another example, this disclosure describes a method comprising: receiving, by a policy agent for one or more computing devices and from a policy controller, a plurality of policies, wherein each policy of the plurality of policies includes one or more policy rules, and wherein each policy rule of the one or more policy rules specifies one or more tags specifying one or more dimensions of a plurality of dimensions; and for each policy rule of the one or more policy rules, allowing or denying, by the policy agent, a traffic flow between objects that belong to categories of the plurality of categories described by the one or more dimensions of a tag of the policy rule, wherein the plurality of categories support application workloads and are assigned tags specifying one or more dimensions of a plurality of dimensions for the application workloads, wherein the application workloads are executed by the one or more computing devices, and wherein the one or more computing devices include the plurality of categories.

In another example, this disclosure describes a policy controller configured to: assign, to a plurality of categories that support application workloads, tags specifying one or more dimensions of a plurality of dimensions for the application workloads, wherein the application workloads are executed by one or more computing devices, and wherein the one or more computing devices include the plurality of categories; and distribute, to respective policy agents of the one or more computing devices, a plurality of policies, wherein each policy of the plurality of policies includes one or more policy rules, wherein each policy rule of the one or more policy rules specifies one or more tags specifying one or more dimensions of the plurality of dimensions, and wherein each policy rule of the one or more policy rules causes the respective policy agents to allow or deny a traffic flow between objects that belong to categories of the plurality of categories described by the one or more dimensions of a tag of the policy rule.

In another example, this disclosure describes a policy agent for one or more computing devices, configured to: receive, from a policy controller, a plurality of policies, wherein each policy of the plurality of policies includes one or more policy rules, and wherein each policy rule of the one or more policy rules specifies one or more tags specifying one or more dimensions of a plurality of dimensions; and for each policy rule of the one or more policy rules, allow or deny a traffic flow between objects that belong to categories of the plurality of categories described by the one or more dimensions of a tag of the policy rule, wherein the plurality of categories support application workloads and are assigned tags specifying one or more dimensions of a plurality of dimensions for the application workloads, wherein the application workloads are executed by the one or more computing devices, and wherein the one or more computing devices include the plurality of categories.

The details of one or more examples of the techniques of this disclosure are set forth in the accompanying drawings and the description below. Other features, objects, and advantages of the techniques will be apparent from the description and drawings, and from the claims.

BRIEF DESCRIPTION OF DRAWINGS

Like reference characters refer to like elements throughout the figures and description.

DETAILED DESCRIPTION

Figure 1:
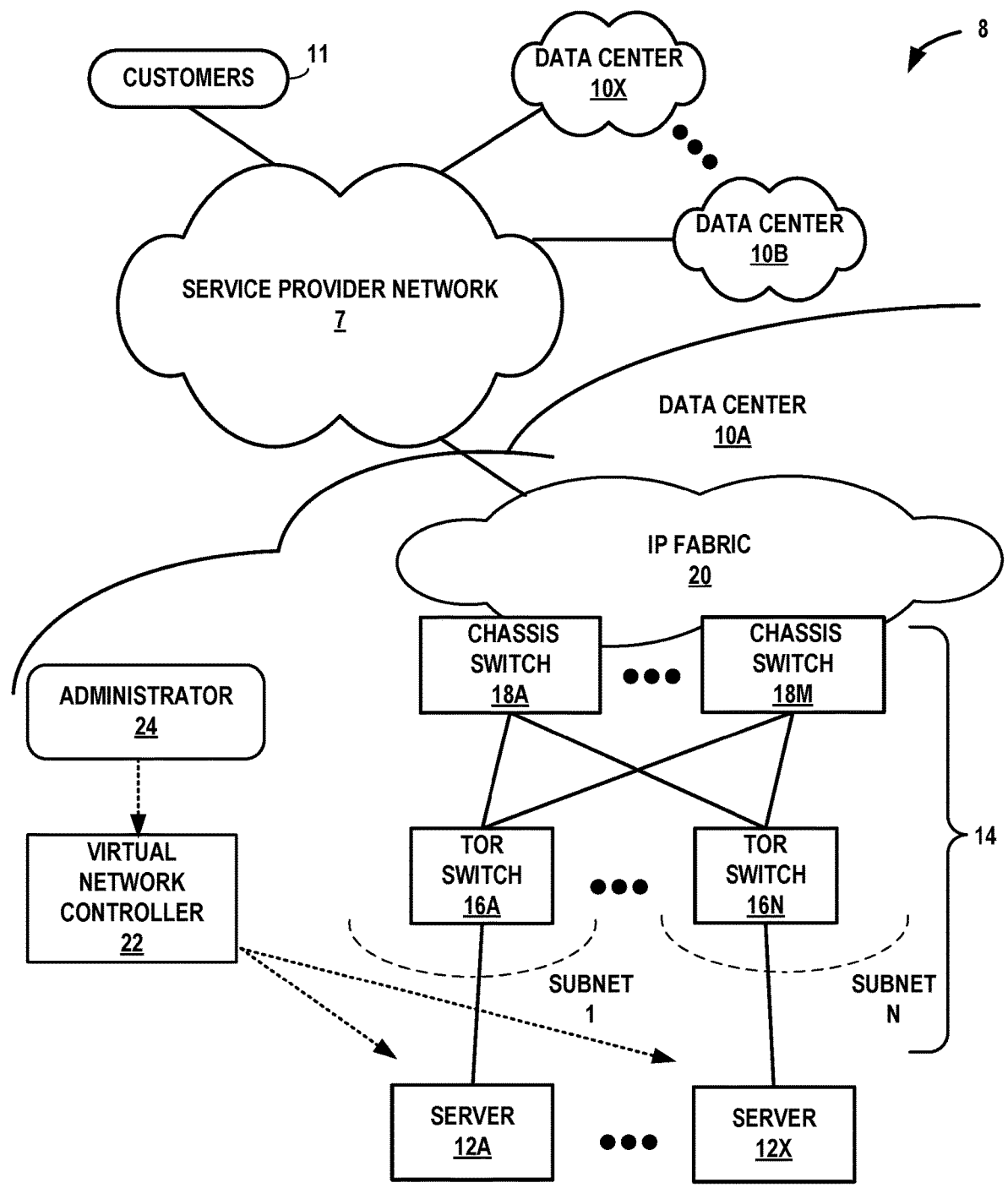
FIG. 1 is a block diagram illustrating an example network having a data center in which examples of the techniques described herein may be implemented.

FIG. 1 is a block diagram illustrating an example network system in which examples of the techniques described herein may be implemented. Network system 2 in the example of FIG. 1 includes data centers 10A-10X (collectively, "data centers 10") interconnected with one another and with customer networks associated with customers 11 via a service provider network 7. In general, each data center 10 provides an operating environment for applications and services for customers 11 coupled to the data center by service provider network 7. Data centers 10 may, for example, host infrastructure equipment, such as networking and storage systems, redundant power supplies, and environmental controls. Service provider network 7 may be coupled to one or more networks administered by other providers, and may thus form part of a large-scale public network infrastructure, e.g., the Internet.

In some examples, each data center 10 may represent one of many geographically distributed network data centers. As illustrated in the example of FIG. 1, each of data centers 10 may be a facility that provides network services for customers 11. Customers 11 may be collective categories such as enterprises and governments or individuals. For example, a network data center may host web services for several enterprises and end users. Other exemplary services may include data storage, virtual private networks, traffic engineering, file service, data mining, scientific- or super-computing, and so on. In some embodiments, each of data centers 10 may be individual network servers, network peers, or otherwise.

In this example, each of data centers 10 includes a set of storage systems and application servers 12A-12X (herein, "servers 12") interconnected via high-speed switch fabric 14 provided by one or more tiers of physical network switches and routers. Switch fabric 14 is provided by a set of interconnected top-of-rack (TOR) switches 16A-16BN (collectively, "TOR switches 16") coupled to a distribution layer of chassis switches 18A-18M (collectively, "chassis switches 18"). Although not shown, each of data centers 10 may also include, for example, one or more non-edge switches, routers, hubs, gateways, security devices such as firewalls, intrusion detection, and/or intrusion prevention devices, servers, computer terminals, laptops, printers, databases, wireless mobile devices such as cellular phones or personal digital assistants, wireless access points, bridges, cable modems, application accelerators, or other network devices.

In this example, TOR switches 16 and chassis switches 18 provide servers 12 with redundant (multi-homed) connectivity to IP fabric 20 and service provider network 7. Chassis switches 18 aggregate traffic flows and provides high-speed connectivity between TOR switches 16. TOR switches 16 may be network devices that provide layer two (e.g., MAC) and/or layer 3 (e.g., IP) routing and/or switching functionality. TOR switches 16 and chassis switches 18 may each include one or more processors and a memory, and that are capable of executing one or more software processes. Chassis switches 18 are coupled to IP fabric 20, which performs layer 3 routing to route network traffic between data centers 10 and customers 11 by service provider network 7.

Virtual network controller 22 ("VNC") provides a logically and in some cases physically centralized controller for facilitating operation of one or more virtual networks within each of data centers 10, such as data center 10A, in accordance with one or more embodiments of this disclosure. In some examples, virtual network controller 22 may operate in response to configuration input received from network administrator 24. Additional information regarding virtual network controller 22 operating in conjunction with other devices of data center 10A or other software-defined network is found in International Application Number PCT/US2013/044378, filed Jun. 5, 2013, and entitled PHYSICAL PATH DETERMINATION FOR VIRTUAL NETWORK PACKET FLOWS, which is incorporated by reference as if fully set forth herein.

Typically, the traffic between any two network devices, such as between network devices within IP fabric 20 (not shown) or between servers 12 and customers 11 or between servers 12, for example, can traverse the physical network using many different paths. A packet flow (or "flow") can be defined by the five values used in a header of a packet, or "five-tuple," i.e., the protocol, Source IP address, Destination IP address, Source port and Destination port that are used to route packets through the physical network. For example, the protocol specifies the communications protocol, such as TCP or UDP, and Source port and Destination port refer to source and destination ports of the connection. A set of one or more packet data units (PDUs) that match a particular flow entry represent a flow. Flows may be broadly classified using any parameter of a PDU, such as source and destination data link (e.g., MAC) and network (e.g., IP) addresses, a Virtual Local Area Network (VLAN) tag, transport layer information, a Multiprotocol Label Switching (MPLS) or Generalized MPLS (GMPLS) label, and an ingress port of a network device receiving the flow. For example, a flow may be all PDUs transmitted in a Transmission Control Protocol (TCP) connection, all PDUs sourced by a particular MAC address or IP address, all PDUs having the same VLAN tag, or all PDUs received at the same switch port.

In some examples, each of data centers 10 may have a need to implement different policies within different computing environments according to the needs of the particular environment. For example, a development environment, a staging environment, and a production environment of data center 10A may each have different requirements for various policies for the network, such as firewall, network, application, or global policies. Furthermore, multiple data centers 10 across different geographic locations may implement different policies within each of their respective internal computing environments due to different customer requirements, networking resources and configurations, etc. If each computing environment within each of data centers 10 were to independently manage its own policies, an administrator may have difficulty ensuring that each policy meets security, reliability, and quality requirements. Furthermore, if each computing environment within each data center were to independently manage its own policies, upgrading one or more of the policies across the multiple data centers may become cumbersome or unmanageable.

In accordance with the techniques of the disclosure, network system 8 implements a scalable, multi-dimensional policy framework to support flexible application of policies for controlling network traffic among workloads executing within one or more computing environments for data centers 10 that may be categorized along multiple different dimensions. Such categories may include applications, deployments, application tiers, geographic sites, virtual networks, virtual machines, interfaces, projects, security requirements, quality requirements, physical devices, such as routers or switches, users, or compliance requirements, for example. Each type of category represents a dimension for workloads that generate or consume network traffic of data centers 10. In some examples, the policy framework described herein permits the administrator to tag objects that execute or otherwise enable workloads with specific dimensions across multiple levels.

As described herein, a "tag" refers to a data structure provides information to categorize an object according to a particular value or set of values. In some examples, the tag comprises a key/value pair, wherein the key describes a category of the object, and the value provides a descriptor for the category. As an example, where tag comprises a first key/value pair, the key of the tag is an "application," and the value associated with the key is a "finance" application. Example levels (e.g., example categories) of such objects include a global environment level, a project level, a virtual network level, a virtual machine level, and an interface level. In one example, tags map security requirements for the objects. Tags may be predefined (e.g., such as a tag for an application, deployment, application tier, or geographic site), or may be implicitly assigned during provisioning (e.g., such as a tag describing infrastructure, a rack, cluster, or data center which is provisioned to support the application). In some examples, multiple tags are applied to a single object (e.g., an "application" and "geographic site" tag may be applied to a single virtual machine), but the object may only have a single tag per type and/or category. In further examples, a user may define "labels" to be used as keys for the key/value pairs of tags such that the user may customize or create his or her own categories for tagging objects. Furthermore, as used herein, "tagging" an object refers to categorizing the object in a category specified by a tag included in a policy rule.

Policies may then be expressed along multiple dimensions in terms of tags corresponding to categories to which the tagged objects belong. Distributed policy agents executing on computing devices that host the workloads may then apply the policies to tagged objects that are members of categories to allow or deny a traffic flow between the tagged objects tagged with one or more categories for one or more dimensions. At least in some cases, the policy agents apply the policies at the interface level of one or more virtual machines to permit or block network traffic flowing to and/or from interfaces of the one or more virtual machines.

In some examples, an extension of Border Gateway Protocol (BGP) is described for communicating the policy framework between categories. For example, a policy agent may receive from a policy controller a BGP message that includes an extended community specifying one or more policy rules, each policy rule including one or more tags that include one or more key/value pairs corresponding to categories that include the tagged objects. Further, each policy rule of the one or more policy rules may specify whether to permit or block network traffic between objects tagged by the one or more tags. Additional information with respect to the implementation of BGP extended communities is described in "BGP Extended Communities Attribute," RFC 4360, Internet Engineering Task Force (IETF), February 2006, available at https://tools.ietf.org/rfc/rfc4360, the entire contents of which is incorporated herein by reference. Thus, the techniques of the disclosure may allow for scalable deployment of policies across different environments within a plurality of data centers 10. Further, the techniques of the disclosure may reduce the complexity and simplify management of such policies within the plurality of data centers 10.

Figure 2:
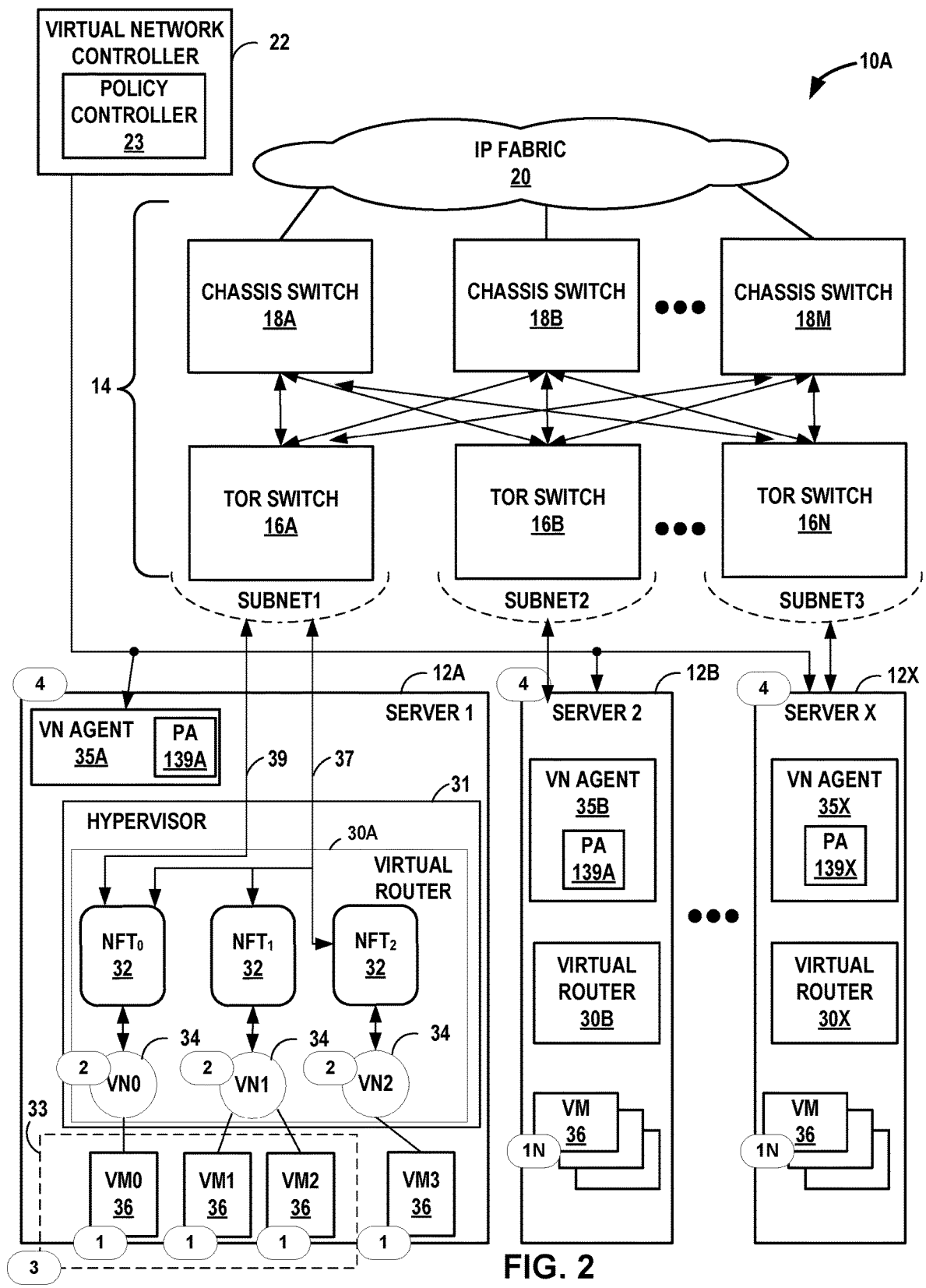
FIG. 2 is a block diagram illustrating an example implementation of the data center of FIG. 1 in further detail.

FIG. 2 is a block diagram illustrating an example implementation of data center 10A of FIG. 1 in further detail. In the example of FIG. 2, data center 10A includes an overlay network that extends switch fabric 14 from physical switches 16, 18 to software or "virtual" switches 30A-30X (collectively, "virtual routers 30"). Virtual routers 30 dynamically create and manage one or more virtual networks 34 usable for communication between application instances. In one example, virtual routers 30 execute the virtual network as an overlay network, which provides the capability to decouple an application's virtual address from a physical address (e.g., IP address) of the one of servers 12A-12X ("servers 12") on which the application is executing. Each virtual network may use its own addressing and security scheme and may be viewed as orthogonal from the physical network and its addressing scheme. Various techniques may be used to transport packets within and across virtual networks 34 over the physical network. In some examples, the techniques described in this disclosure provide multicast service within virtual networks 34 without requiring multicast support in the underlying physical network.

Each virtual router 30 may execute within a hypervisor, a host operating system or other component of each of servers 12. Each of servers 12 may represent an x86 or other general-purpose or special-purpose server capable of executing virtual machines 36. In the example of FIG. 2, virtual router 30A executes within hypervisor 31, also often referred to as a virtual machine manager (VMM), which provides a virtualization platform that allows multiple operating systems to concurrently run on one of servers 12. In the example of FIG. 2, virtual router 30A manages virtual networks 34, each of which provides a network environment for execution of one or more virtual machines (VMs) 36 on top of the virtualization platform provided by hypervisor 31. Each VM 36 is associated with one of the virtual networks VN0-VN1 and may represent tenant VMs running customer applications such as Web servers, database servers, enterprise applications, or hosting virtualized services used to create service chains. In some cases, any one or more of servers 12 or another computing device may host customer applications directly, i.e., not as virtual machines. In some cases, some of VMs 36 may represent containers, another form of virtualized execution environment. That is, both virtual machines and container are examples of virtualized execution environments for executing workloads.

In general, each VM 36 may be any type of software application and may be assigned a virtual address for use within a corresponding virtual network 34, where each of the virtual networks may be a different virtual subnet provided by virtual router 30A. A VM 36 may be assigned its own virtual layer three (L3) IP address, for example, for sending and receiving communications but may be unaware of an IP address of the physical server 12A on which the virtual machine is executing. In this way, a "virtual address" is an address for an application that differs from the logical address for the underlying, physical computer system, e.g., server 12A in the example of FIG. 1 or 2.

In one implementation, each of servers 12 includes a corresponding one of virtual network (VN) agents 35A-35X (collectively, "VN agents 35") that controls the overlay of virtual networks 34 and that coordinates the routing of data packets within server 12. In general, each VN agent 35 communicates with virtual network controller 22, which generates commands to control routing of packets through data center 10A. VN agents 35 may operate as a proxy for control plane messages between virtual machines 36 and virtual network controller 22. For example, a VM 36 may request to send a message using its virtual address via the VN agent 35A, and VN agent 35A may in turn send the message and request that a response to the message be received for the virtual address of the VM 36 that originated the first message. In some cases, a VM 36 may invoke a procedure or function call presented by an application programming interface of VN agent 35A, and the VN agent 35A may handle encapsulation of the message as well, including addressing. In accordance with the techniques of the disclosure, each VN agent 35 further includes a respective policy agent 139A-139X (collectively, policy agents 139") for applying one or more policies to one or more categories, as will described in more detail below.

In one example, network packets, e.g., layer three (L3) IP packets or layer two (L2) Ethernet packets generated or consumed by the instances of applications executed by virtual machines 36 within the virtual network domain may be encapsulated in another packet (e.g., another IP or Ethernet packet) that is transported by the physical network. The packet transported in a virtual network may be referred to herein as an "inner packet" while the physical network packet may be referred to herein as an "outer packet" or a "tunnel packet." Encapsulation and/or de-capsulation of virtual network packets within physical network packets may be performed within virtual routers 30, e.g., within the hypervisor or the host operating system running on each of servers 12. As another example, encapsulation and de-capsulation functions may be performed at the edge of switch fabric 14 at a first-hop TOR switch 16 that is one hop removed from the application instance that originated the packet. This functionality is referred to herein as tunneling and may be used within data center 10A to create one or more overlay networks. Besides IPinIP, other example tunneling protocols that may be used include IP over GRE, VxLAN, MPLS over GRE, MPLS over UDP, etc.

As noted above, virtual network controller 22 provides a logically centralized controller for facilitating operation of one or more virtual networks within data center 10A. Virtual network controller 22 may, for example, maintain a routing information base, e.g., one or more routing tables that store routing information for the physical network as well as one or more overlay networks of data center 10A. Similarly, switches 16, 18 and virtual routers 30 maintain routing information, such as one or more routing and/or forwarding tables. In one example implementation, virtual router 30A of hypervisor 31 implements a network forwarding table (NFT) 32 for each virtual network 34. In general, each NFT 32 stores forwarding information for the corresponding virtual network 34 and identifies where data packets are to be forwarded and whether the packets are to be encapsulated in a tunneling protocol, such as with a tunnel header that may include one or more headers for different layers of the virtual network protocol stack.

In accordance with the techniques of the disclosure, virtual network controller 22 further includes policy controller 23. Policy controller 23 is configured to tag a plurality of objects across a plurality of levels. In some examples, the plurality of levels include a level of an object, such as a global environment level, a project level, a virtual network level, a virtual machine level, or an interface level of the object. In further examples, policy controller 23 tags the plurality of objects across a plurality of categories. In some examples, the plurality of categories include applications executing within VMs 36, deployments, application tiers, geographic sites, virtual networks, VMs 36, interfaces, projects, security requirements, quality requirements, users, or compliance requirements.

In some examples, policy controller 23 further distributes, to respective policy agents 139 of VN agents 35, a plurality of policies. Each policy of the plurality of policies includes one or more policy rules for controlling network traffic. Each policy rule of the plurality of policy rules specifies one or more tags, each tag further specifying one or more dimensions of the categories.

Upon receiving the plurality of policies, each policy agent 139 applies the one or more policy rules of each of the plurality of policies to tagged objects corresponding to tags of the one or more policy rules to control network traffic between the tagged objects. For example, policy agents 139 under the direction of policy controller 23 express the one or more policy rules at logical interfaces of VMs 36 that are tagged with tags corresponding to tags of the one or more policy rules. Policy agents 139 permit or block network traffic to and/or from the logical interfaces based on the one or more policy rules.

As an illustration of the above, in the example of FIG. 2, policy agent 139A under the direction of policy controller 23 has tagged virtual machines VM0 36, VM1 36, VM2 36, and VM3 36 as belonging to a category described by tag 1. Further, policy agent 139A has categorized virtual networks VN0 34, VN1 34, and VN2 34 in a category described by tag 2, respectively. Furthermore, virtual machines VM0 36, VM1 36, and VM2 36 belong to a first project 33, which policy agent 139A has categorized as belonging to a category described by tag 3. Still further, policy agent 139A has categorized server 1 12A as belonging to a category described by tag 4.

In some examples, the one or more policy rules describe security or firewall rules, and based on the one or more security or firewall rules, each policy agent 139 may allow or deny network traffic between categories described by the one or more tags. In other examples, each of the one or more policy rules describe one or more firewall, network, application, or global policy rules. Thus, by applying the policies as described herein, policy agents 139 may apply specific policy rules so as to enable workloads with specific dimensions. Accordingly, the techniques of the disclosure may allow for scalable deployment of policies across different environments within a plurality of data centers 10. Further, the techniques of the disclosure may reduce the complexity and simplify management of such policies within the plurality of data centers 10.

In some examples, policies are "inherited" in that policies applied to parent objects are likewise applied to objects that are children of the parent objects in a hierarchical fashion. As one example, policy agent 139A receives a first policy rule that includes tag 3 that is applied to project 33. Policy agent 139A applies the first policy rule to project 33. Policy agent 139A further applies the first policy rule to children of the first project, such as virtual networks, virtual machines, and interfaces within the first project, but not to virtual networks, virtual machines, and interfaces within a second project, so as to permit or deny network traffic to the first project and objects within the first project as specified by the first policy rule. In the example of FIG. 2, policy agent 139A applies the first policy rule to virtual machines VM0 36, VM1 36, and VM2 36 because virtual machines VM0 36, VM1 36, and VM2 36 are children of project 33. However, policy agent 139A does not apply the first policy rule to virtual machine VM3 36, which is not part of project 33.

Continuing the forgoing example, policy agent 139A receives a second policy rule that includes tag 1 that describes virtual machines 36. Policy agent 139A therefore applies both the first policy rule and the second policy rule to virtual machines VM0 36, VM1 36, and VM2 36. Further, policy agent 139A applies both the first policy rule and the second policy rule to interfaces of virtual machines VM0 36, VM1 36, and VM2 36 (not depicted), which are children objects of virtual machines 36. However, policy agent 139A does not apply the second policy rule to project 33 because project 33 is a parent, not a child, of virtual machines VM0 36, VM1 36, and VM2 36.

In some examples of the techniques of the disclosure, the policy framework implements complex regular expressions to apply tags for such policies to specific environments or infrastructure. For example, such policy rules include tag expressions to group and/or segment workloads. As a further example, policy agent 139A applies a match condition to match the tag expressions with tagged objects corresponding to the tag expressions. Thus, global policies may be distributed to a plurality of policy agents 139, and each policy agent 139 may selectively apply only those policy rules that include tag expressions that correspond to tagged objects.

In some examples, policy controller 23 distributes one or more policy rules via Border Gateway Protocol (BGP). Such a BGP message may include an action for a particular traffic flow, such as allowing or denying the flow and a list of one or more destination protocols and ports for application of the specified action. In such an example, the BGP message may further specify one or more tags for an object as an extended community for BGP. Additional information with respect to BGP is described in "BGP MPLS-Based Ethernet VPN," RFC 7432, Internet Engineering Task Force (IETF), February 2015, available at https://tools.ietf.org/html/rfc7432, the entire contents of which is incorporated herein by reference.

Figure 3:
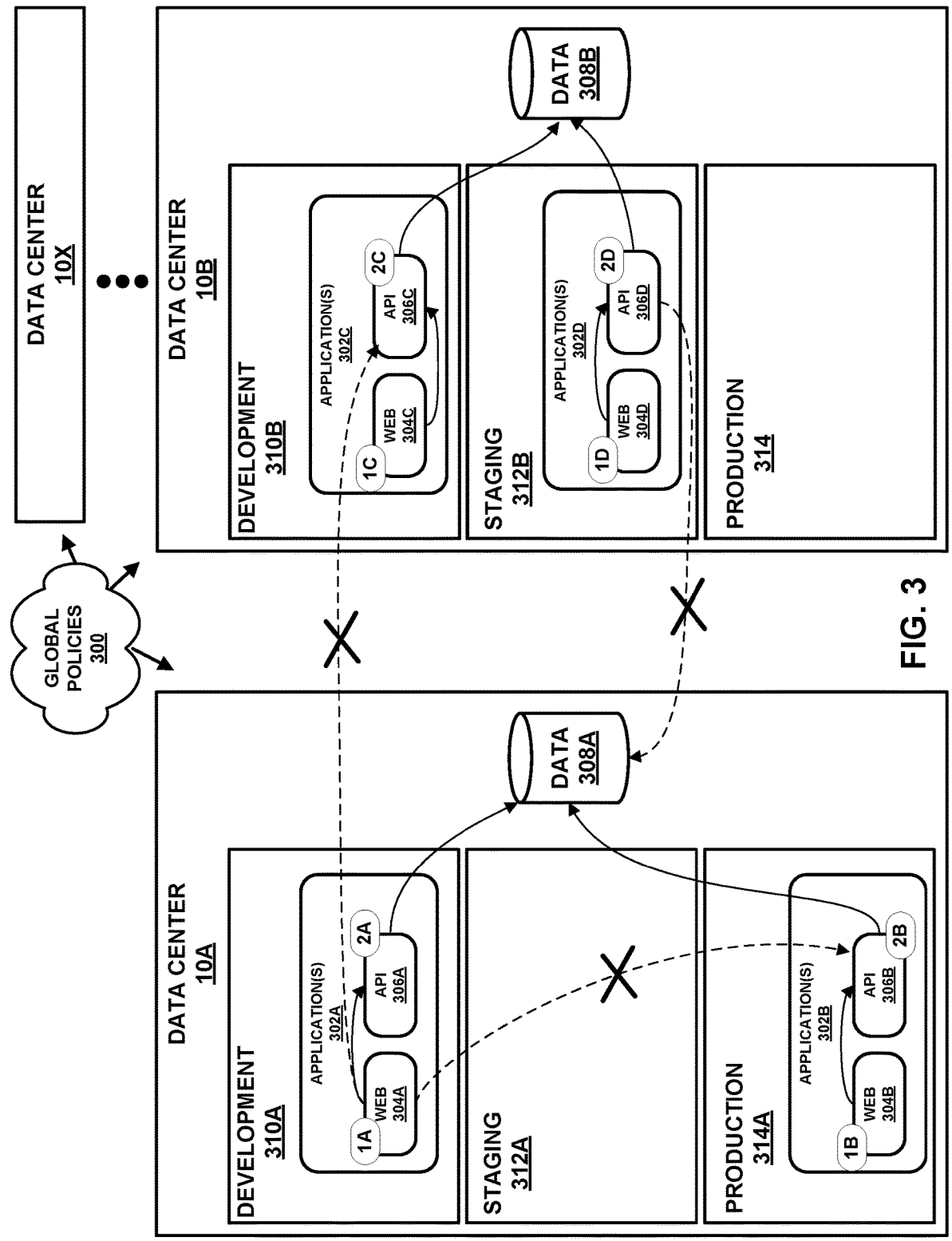
FIG. 3 is a block diagram illustrating an example of a plurality of data centers in which examples of the techniques described herein may be implemented.

FIG. 3 is a block diagram illustrating an example of the plurality of data centers 10 in which examples of the techniques described herein may be implemented. Each of data centers 10A-10X (collectively "datacenters 10") may operate in a substantially similar fashion to datacenters 10 of FIG. 1 and FIG. 2. In some examples, one or more of datacenters 10 implements a cloud environment executing Openstack, while in another example, one or more of data centers 10 is a cloud environment executing Kubernetes, while in yet another example, one or more of data centers 10 implements a cloud environment executing Amazon Web Services, while in yet another example, one or more of data centers 10 executes on "bare metal" infrastructure. In some examples, each of data centers 10 executes a different infrastructure than each other data center 10.

In the example of FIG. 3, Each data centers 10 comprises a database 308 and three different environments: a development environment 310, a staging environment 312, and a production environment 314. Each environment of each data center 10 is capable of executing one or more applications 302A-302D (collectively, "applications 302"), such as application 302A executing within development environment 310A of data center 10A, application 302B executing within production environment 314A of data center 10A, application 302C executing within development environment 310B of data center 10B, and application 302D executing within staging environment 312B of data center 10B. In one example, each application 302 is an instance of a finance application. Policies as described herein are robust and extensible for application in many different types of cloud environments described above.

Within an environment, each application may include a plurality of applications. In the example of FIG. 3, application 302A of development environment 310A executes web process 304A and Application Program Interface (API) process 306A. Further, application 302B of production environment 314A executes web process 304B and API process 306B. Application 302C of development environment 310B executes web process 304C and API process 306C. Still further, application 302D of staging environment 312B executes web process 304D and API process 306D. However, in other examples, each application 302 of a respective environment 310A, 312A, 314A, 310B, 312B, or 314B may execute additional or different processes than each other application 302. Furthermore, in some examples, the applications executed within each respective environment 310A, 310B, 312A, 312B, 314A, and 314B may be similar or different from the applications executed within each other environment 310A, 310B, 312A, 312B, 314A, and 314B.

It may be desirable to ensure that processes 304, 306 of each application 302 of a respective environment 310, 312, 314 does not exchange network traffic with processes 304, 306 of an application 302 within a different environment 310, 312, 314, while still permitting network traffic to flow between different processes 304, 306 within the same application 302. For example, an administrator may desire to allow network traffic between web process 304A and API process 306A because each of web process 304A and API process 306 operate within the same application 302A within development environment 310A. Further, the administrator may desire to prevent network traffic between web process 304A (e.g., operating within development environment 310A of data center 10A) and API process 306B (e.g., operating within production environment 314A of data center 10A) or between web process 304A (e.g., operating within development environment 310A of data center 10A) and API process 306C (e.g., operating within development environment 310B of data center 10B). Further, an administrator may desire to permit processes 304, 306 executing within an application 302 within the same data center 10 to access the same database 308, regardless of the specific environment 310, 312, or 314 within which the particular application 302 executes. For example, an administrator may desire to allow API process 306A executing within application 302A and API process 306B executing within application 302B to each access database 308A.

If the administrator were to independently manage network traffic policies for each process 304, 306 within each application 302 within each environment 312, 312, and 314 within each data center 10, the administrator may have difficulty ensuring that each network traffic policy meets security, reliability, and quality requirements. Furthermore, upgrading one or more of the policies across multiple data centers 10 may become cumbersome or unmanageable.

In accordance with the techniques of the disclosure, one or more tags specifying one or more categories are applied to each process 304, 306. As depicted in the example of FIG. 3, policy controller 23 of VNC 22 applies tag "1A" to web process 304A, which specifies that web process 304A belongs to development environment 310A. Similarly, policy controller 23 applies tag "2A" to API process 306A, which specifies that web process 304A belongs to development environment 310A. In contrast, policy controller 23 applies tag "1B" to web process 304B and tag "2B" to API process 306B, each of which specify that the respective application belongs to production environment 314A. Furthermore, tag "1C" is applied to web process 304C and tag "2C" is applied API process 306C, each of which specify that the respective application belongs to development environment 310B; and tag "1D" is applied to web process 304D and tag "2D" is applied to API process 306D, each of which specify that the respective application belongs to staging environment 312B.

In one example, a policy agent 139 of a VN agent 35 receives, from policy controller 23, one or more policies specifying one or more policy rules for allowing or blocking network traffic to and from applications 302. Each of the one or more policy rules specify one or more tags, each of the tags specifying one or more categories for application of the policy rules. Policy agent 139 applies, to each process 304, 306 of each application 302, only those policy rules that include tags matching tags applied to respective processes 304, 306.

For example, policy agent 139 may receive a first policy rule that permits network traffic destined for API process 306B and includes tag 1B. Policy agent 139 may examine tags for each of processes 304, 306, but apply the policy rule only to web process 304B because web process 304B is categorized within the same category as specified by tag 1B. VN agent 35 may subsequently permit network traffic flowing from an interface of a virtual machine executing web process 304B to an interface of a virtual machine executing API process 306B and block other traffic flowing to the interface of the virtual machine executing API process 306B, such as traffic flowing from an interface of a virtual machine executing web process 304A.

Similarly, policy agent 139 may receive a second policy rule that permits network traffic destined for database 308A and includes tags 2A and 2B. Policy agent 139 may examine categories applied to each of processes 304, 306. Policy agent 139 applies the policy rule only to API processes 306A and 306B because API processes 306A and 306B are categorized within the same category as specified by tags 2A and 2B, respectively. VN agent 35 may subsequently permit network traffic flowing from either an interface of a virtual machine executing API process 306A or the interface of the virtual machine executing API process 306B to an interface of database 308A and block other traffic flowing to the interface of database 308A, such as traffic flowing from a virtual machine executing API process 306D.

As depicted in the foregoing example, the second policy rule may specify tags 2A and 2B in a Boolean expression, e.g., (2A OR 2B). However, in accordance with the techniques of the disclosure, each policy rule may further include complex regular expressions that specify tags for one or more objects. For example, a policy rule may include one or more Boolean operators (e.g., AND, OR, NOT), mathematical operators (e.g., addition, subtraction, multiplication, division), bit-shifting operations, matrix operations, text parsing operators, or a combination of any of the foregoing.

In the foregoing examples, policy agent 139 implements whitelisting, in that all traffic between designated interfaces of virtual machines is preemptively blocked, and the one or more policy rules whitelist specific traffic flows (e.g., specify specific traffic flows between interfaces of virtual machines that are permitted). In alternate examples, policy agent 139 implements blacklisting, in that all traffic between interfaces of virtual machines is preemptively allowed, and the one or more policy rules blacklist specific traffic flows (e.g., specify specific traffic flows between interfaces of virtual machines that are blocked). In alternate examples, the one or more policy rules may include a combination of whitelisting or blacklisting specific traffic flows or groups of traffic flows between interfaces of virtual machines.

In the example of FIG. 3, policy agent 139 is depicted as receiving, from policy controller 23, tags specifying the specific environments to which processes 304, 306 belong. However, in other examples, policy agent 139 may receive tags that specify other categories for organizing processes 304, 306. For example, tags for processes 304, 306 may additionally, or alternatively, specify one or more application types, deployments, application tiers, geographic sites, virtual networks, virtual machines, interfaces, projects, security requirements, quality requirements, users, or compliance requirements.

For examples, one or more of data centers 10 implements a cloud environment executing OpenStack. In this example, the cloud environment supports three projects, each providing a finance application comprising three virtual networks. Within such a data center 10, policy controller 23 may assign one or more tags at a project level. For example, policy controller 23 may assign a tag comprising a key of "application" and a value of "finance" and a tag comprising a key of "deployment" and a value of "development" to a first project. Policy controller 23 may assign a tag comprising a key of "application" and a value of "finance" and a tag comprising a key of "deployment" and a value of "staging" to a second project. Policy controller 23 may assign a tag comprising a key of "application" and a value of "finance" and a tag comprising a key of "deployment" and a value of "production" to a third project. Further, within each project, policy controller 23 may assign tags to each of the three virtual networks. For example, policy controller 23 assigns a tag comprising a key of "tier" and a value of "web" to a first virtual network, a tag comprising a key of "tier" and a value of "application" to a second virtual network, and a tag comprising a key of "tier" and a value of "database" to a third virtual network. Policy controller 23 distributes one or more policy rules to policy agent 139, which applies the one or more policy rules to interfaces of virtual machines within the data center 10 based on the tags applied to the projects and virtual networks.

In some examples, one or more of data centers 10 is a cloud environment executing Kubernetes. In this example, the cloud environment supports two namespaces, each providing a finance application comprising three virtual networks. Within such a data center 10, policy controller 23 may assign one or more tags at a namespace level. For example, policy controller 23 may assign a tag comprising a key of "application" and a value of "finance," a tag comprising a key of "deployment" and a value of "development," and a tag comprising a key of "site" and a value of "US" to a first namespace. Policy controller 23 may assign a tag comprising a key of "application" and a value of "finance," a tag comprising a key of "deployment" and a value of "production," and a tag comprising a key of "site" and a value of "US" to a second namespace. Further, within each namespace, policy controller 23 may assign tags to each of the three virtual networks. For example, policy controller 23 assigns a tag comprising a key of "tier" and a value of "web" to a first virtual network, a tag comprising a key of "tier" and a value of "application" to a second virtual network, and a tag comprising a key of "tier" and a value of "database" to a third virtual network. Policy controller 23 distributes one or more policy rules to policy agent 139, which applies the one or more policy rules to interfaces of virtual machines within the data center 10 based on the tags applied to the projects and virtual networks.

In some examples, a first data center 10A implements a cloud environment executing Amazon Web Services and a second data center 10B executes on "bare metal" infrastructure." In this example, data center 10A supports a first finance application comprising three virtual networks and executing within a development deployment, while data center 10A supports a second finance application comprising three virtual networks and executing within a production deployment. In this example, policy controller 23 may assign one or more tags at an application level. For example, policy controller 23 may assign a tag comprising a key of "application" and a value of "finance," a tag comprising a key of "deployment" and a value of "development," and a tag comprising a key of "site" and a value of "US" to the first application executing within data center 10A. Policy controller 23 may further assign a tag comprising a key of "application" and a value of "finance," a tag comprising a key of "deployment" and a value of "production," and a tag comprising a key of "site" and a value of "US" to the second application executing within data center 10B. Further, within each application, policy controller 23 may assign tags to each of the three virtual networks. For example, policy controller 23 assigns a tag comprising a key of "tier" and a value of "web" to a first virtual network, a tag comprising a key of "tier" and a value of "application" to a second virtual network, and a tag comprising a key of "tier" and a value of "database" to a third virtual network. Policy controller 23 distributes one or more policy rules to policy agent 139, which applies the one or more policy rules to interfaces of virtual machines within the data center 10 based on the tags applied to the projects and virtual networks.

In the example of FIG. 3, policy controller 23 is described as distributing policy rules including tags for objects at a project level. However, policy controller 23 may additionally or alternatively distributing policy rules including tags specifying various different object levels, such as a global environment level, a project level, a virtual network level, a virtual machine level, or an interface level.

In an example implantation of the techniques of the disclosure, policy controller 23 uses a plurality of configuration objects to implement the one or more policies. As one example, policy controller 23 applies a first set of configuration objects at a global level. The first set configuration objects includes global application policy sets, global firewall policies, global firewall rules, and global tags across a plurality of levels and/or categories. Policy controller 23 distributes, to policy agents 139, the first set of configuration objects at the global level. Policy agents 139 match global tags associated with global application policy sets, global firewall policies, and global firewall rules to objects tagged with the global tags. Based on the global application policy sets, global firewall policies, and global firewall rules, policy agents 139 allow or block network traffic between interfaces of the objects tagged with the global tags.

Furthermore, policy controller 23 applies a second set of configuration objects at a project level. The second set of policy rules may include project-specific application policy sets, firewall policies, firewall rules, and tags across a plurality of levels. Policy controller 23 distributes, to policy agents 139, the second set of configuration objects at the project level. Policy agents 139 match project tags associated with project-specific application policy sets, firewall policies, and firewall rules to objects tagged with the project tags. Based on the project-specific application policy sets, firewall policies, and firewall rules, policy agents 139 allow or block network traffic between interfaces of the objects tagged with the project tags.

In further examples, policy controller 23 may specify lower-level configuration objects, such as application policy sets, firewall policies, firewall rules, and tags defined at a virtual network-specific level, a virtual machine-specific level, and/or an interface-specific level. By doing so, policy controller 23 may apply a hierarchical set of policies to a plurality of objects within one or more data centers 10. Thus, the techniques of the disclosure allow for distribution of simplified traffic policies that are scalable and robust across many different types of deployments and execution environments.

Figure 4:
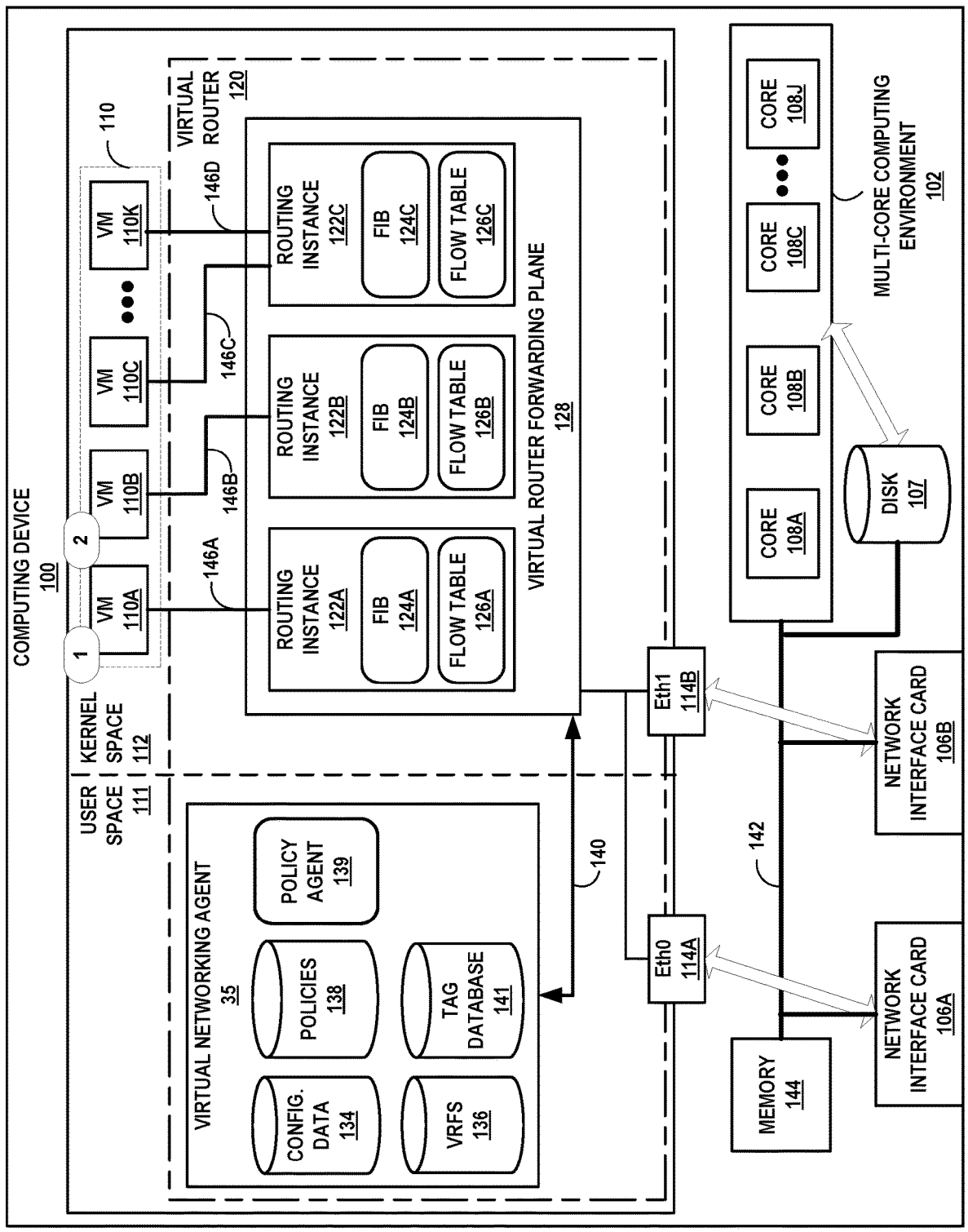
FIG. 4 is a block diagram illustrating a computing device that executes an example virtual router for virtual networks according to techniques described herein.

FIG. 4 is a block diagram illustrating an example computing device 100 that executes a virtual router 120 for virtual networks according to techniques described herein. Computing device 100 may represent any of servers 12 of FIGS. 1-3 or other device, such as any of TOR switches 16.

Computing device 100 includes in this example a system bus 142 coupling hardware components of a computing device 100 hardware environment. System bus 142 couples memory 144, network interface cards (NICs) 106A-106B (collectively, "NICs 106"), storage disk 107, and multi-core computing environment 102 having a plurality of processing cores 108A-108J (collectively, "processing cores 108"). Network interface cards 106 include interfaces configured to exchange packets using links of an underlying physical network. Multi-core computing environment 102 may include any number of processors and any number of hardware cores from, for example, four to thousands. Each of processing cores 108 each includes an independent execution unit to perform instructions that conform to an instruction set architecture for the core. Processing cores 108 may each be implemented as separate integrated circuits (ICs) or may be combined within one or more multi-core processors (or "many-core" processors) that are each implemented using a single IC (i.e., a chip multiprocessor).

Disk 107 represents computer readable storage media that includes volatile and/or non-volatile, removable and/or non-removable media implemented in any method or technology for storage of information such as processor-readable instructions, data structures, program modules, or other data. Computer readable storage media includes, but is not limited to, random access memory (RAM), read-only memory (ROM), EEPROM, flash memory, CD-ROM, digital versatile discs (DVD) or other optical storage, magnetic cassettes, magnetic tape, magnetic disk storage or other magnetic storage devices, or any other medium that can be used to store the desired information and that can be accessed by cores 108.

Main memory 144 includes one or more computer-readable storage media, which may include random-access memory (RAM) such as various forms of dynamic RAM (DRAM), e.g., DDR2/DDR3 SDRAM, or static RAM (SRAM), flash memory, or any other form of fixed or removable storage medium that can be used to carry or store desired program code and program data in the form of instructions or data structures and that can be accessed by a computer. Main memory 144 provides a physical address space composed of addressable memory locations.

Memory 144 may in some examples present a non-uniform memory access (NUMA) architecture to multi-core computing environment 102. That is, cores 108 may not have equal memory access time to the various storage media that constitute memory 144. Cores 108 may be configured in some instances to use the portions of memory 144 that offer the lowest memory latency for the cores to reduce overall memory latency.

In some instances, a physical address space for a computer-readable storage medium may be shared among one or more cores 108 (i.e., a shared memory). For example, cores 108A, 108B may be connected via a memory bus (not shown) to one or more DRAM packages, modules, and/or chips (also not shown) that present a physical address space accessible by cores 108A, 108B. While this physical address space may offer the lowest memory access time to cores 108A, 108B of any of portions of memory 144, at least some of the remaining portions of memory 144 may be directly accessible to cores 108A, 108B. One or more of cores 108 may also include an L1/L2/L3 cache or a combination thereof. The respective caches for cores 108 offer the lowest-latency memory access of any of storage media for the cores 108.

Memory 144, network interface cards (NICs) 106A-106B (collectively, "NICs 106"), storage disk 107, and multi-core computing environment 102 provide an operating environment for a software stack that executes a virtual router 120 and one or more virtual machines 110A-110K (collectively, "virtual machines 110"). Virtual machines 110 may represent example instances of any of virtual machines 36 of FIG. 2. The computing device 100 partitions the virtual and/or physical address space provided by main memory 144 and in the case of virtual memory by disk 107 into user space 111, allocated for running user processes, and kernel space 112, which is protected and generally inaccessible by user processes. An operating system kernel (not shown in FIG. 4) may execute in kernel space and may include, for example, a Linux, Berkeley Software Distribution (BSD), another Unix-variant kernel, or a Windows server operating system kernel, available from Microsoft Corp. Computing device 100 may in some instances execute a hypervisor to manage virtual machines 110 (also not shown in FIG. 4). An example hypervisor 31 is illustrated in FIG. 2. Example hypervisors include Kernel-based Virtual Machine (KVM) for the Linux kernel, Xen, ESXi available from VMware, Windows Hyper-V available from Microsoft, and other open-source and proprietary hypervisors. In some examples, specialized hardware programmed with routing information such as FIBs 124 may execute the virtual router 120.

Eth0 114A and Eth1 114B represent devices according to a software device model and provide device driver software routines for handling packets for receipt/transmission by corresponding NICs 106. Packets received by NICs 106 from the underlying physical network fabric for the virtual networks may include an outer header to allow the physical network fabric to tunnel the payload or "inner packet" to a physical network address for one of NICs 106. The outer header may include not only the physical network address but also a virtual network identifier such as a VxLAN tag or Multiprotocol Label Switching (MPLS) label that identifies one of the virtual networks as well as the corresponding routing instance 122. An inner packet includes an inner header having a destination network address that conform to the virtual network addressing space for the virtual network identified by the virtual network identifier. For example, virtual router forwarding plane 128 may receive by Eth1 from NIC 106 a packet having an outer header than includes a VxLAN associated in virtual router forwarding plane 128 with routing instance 122A. The packet may have an inner header having a destination network address that is a destination address of VM 110A that taps, via tap interface 146A, into routing instance 122A.

Virtual router 120 in this example includes a kernel space 112 module: virtual router forwarding plane 128, as well as a user space 111 module: VN agent 35. Virtual router forwarding plane 128 executes the "forwarding plane" or packet forwarding functionality of the virtual router 120 and VN agent 35 executes the "control plane" functionality of the virtual router 120. VN agent 35 may represent an example instance of any of VN agents 35 of FIG. 2.

Virtual router forwarding plane 128 includes multiple routing instances 122A-122C (collectively, "routing instances 122") for corresponding virtual networks. Each of routing instances 122 includes a corresponding one of forwarding information bases (FIBs) 124A-124C (collectively, "FIBs 124") and flow tables 126A-126C (collectively, "flow tables 126"). Although illustrated as separate data structures, flow tables 126 may in some instances be logical tables implemented as a single table or other associative data structure in which entries for respective flow tables 126 are identifiable by the virtual network identifier (e.g., a VRF identifier such as VxLAN tag or MPLS label)). FIBs 124 include lookup tables that map destination addresses to destination next hops. The destination addresses may include layer 3 network prefixes or layer 2 MAC addresses. Flow tables 126 enable application of forwarding policies to flows. Each of flow tables 126 includes flow table entries that each match one or more flows that may traverse virtual router forwarding plane 128 and include a forwarding policy for application to matching flows. For example, virtual router forwarding plane 128 attempts to match packets processed by routing instance 122A to one of the flow table entries of flow table 126A. If a matching flow table entry exists for a given packet, virtual router forwarding plane 128 applies the flow actions specified in a policy to the packet. This may be referred to as "fast-path" packet processing. If a matching flow table entry does not exist for the packet, the packet may represent an initial packet for a new packet flow and virtual router forwarding plane 128 may request VN agent 35 to install a flow table entry in the flow table for the new packet flow. This may be referred to as "slow-path" packet processing for initial packets of packet flows and is represented in FIG. 4 by slow path 140.

In this example, VN agent 35 may be a user space 111 process executed by computing device 100. VN agent 35 includes configuration data 134, virtual routing and forwarding instances configurations 136 ("VRFs 136"), and policy table 138 ("policies 138"). VN agent 35 exchanges control information with one or more virtual network controllers (e.g., VNC 22 of FIGS. 1-2). Control information may include, virtual network routes, low-level configuration state such as routing instances and forwarding policy for installation to configuration data 134, VRFs 136, and policies 138. VN agent 35 may also report analytics state, install forwarding state to FIBs 124 of virtual router forwarding plane 128, discover VMs 110 and attributes thereof. As noted above, VN agent 35 further applies slow-path packet processing for the first (initial) packet of each new flow traversing virtual router forwarding plane 128 and installs corresponding flow entries to flow tables 126 for the new flows for fast path processing by virtual router forwarding plane 128 for subsequent packets of the flows.

In accordance with the techniques of the disclosure, VN agent 35 further includes tag database 141. As described above, policy controller 23 of VNC 22 assigns one or more tags specifying one or more levels and/or one or more categories for the objects. Policy controller 23 may apply tags to objects across a plurality of levels or categories, as well as apply the tags to objects across a plurality of data centers Policy controller 23 distributes these tags to VN agent 35, which stores the assigned tags in tag database 141.

VN agent 35 further includes a policy agent 139. Policy agent 139 receives, from policy controller 23, one or more policies and stores such policies in policies 138. Each of policies 138 may include one or more policy rules that spec whether particular network traffic should be allowed or blocked. Further, each policy rule includes one or more policy tags that specify to which objects, such as applications executing on VMs 110, the policy rules apply. For example, policy agent 139 may cross reference the one or more tags of a policy rule with one or more tags in tag database 141 to determine one or more objects to which the policy rule should be applied. Upon determining the one or more objects to which the policy rule should be applied, policy agent 139 allows or blocks network traffic originating from or destined to the one or more objects in accordance with the policy rule. In some examples, policy agent 139 allows or blocks network traffic at an interface level of VMs 110. In this example, interfaces 146 inherit tags from parent objects, such as VMs 110, virtual networks, parent projects, or global policy sets. 10. Thus, policy agent 139 allows or blocks network traffic destined for or originating from interfaces 146 of VMs 110 by matching tags of one or more policy rules to tags applied to interfaces 146.

As one example, policy agent 139 receives, from policy controller 23, a first policy rule that permits network traffic originating from interface 146C and includes tag 1. Policy agent 139 may examine categories applied to interfaces 146, determine that a category of interface 146A matches tag 1 of the first policy rule, and apply the policy rule only to interface 146A. VN agent 35 may subsequently permit network traffic originating from interface 146C and destined for interface 146A.

As another example, policy agent 139 receives, from policy controller 23, a second policy rule that blocks network traffic originating from interface 146C and includes tag 2. Policy agent 139 may examine categories applied to interfaces 146, determine that the category of interface 146B matches tag 2 of the second policy rule, and apply the policy rule only to interface 146B. VN agent 35 may subsequently block network traffic originating from interface 146C and destined for interface 146B.

To update policies for a particular object or group of objects, an administrator may instruct policy controller 23 to distribute new policies to policy agents 139 of respective VN agents 35 of a plurality of data centers 10. In some examples, policy controller 23 distributes the new policies via a BGP message. In this fashion, an administrator may manage a scalable, multi-dimensional policy framework for a plurality of data centers. Further, each policy agent 139 may automatically apply the relevant policies without requiring the administrator to individually manage or update policies for each VN agent 35. Thus, the techniques of the disclosure may greatly reduce the complexity and simplify management of such policies across the plurality of data centers 10.

Figure 5:
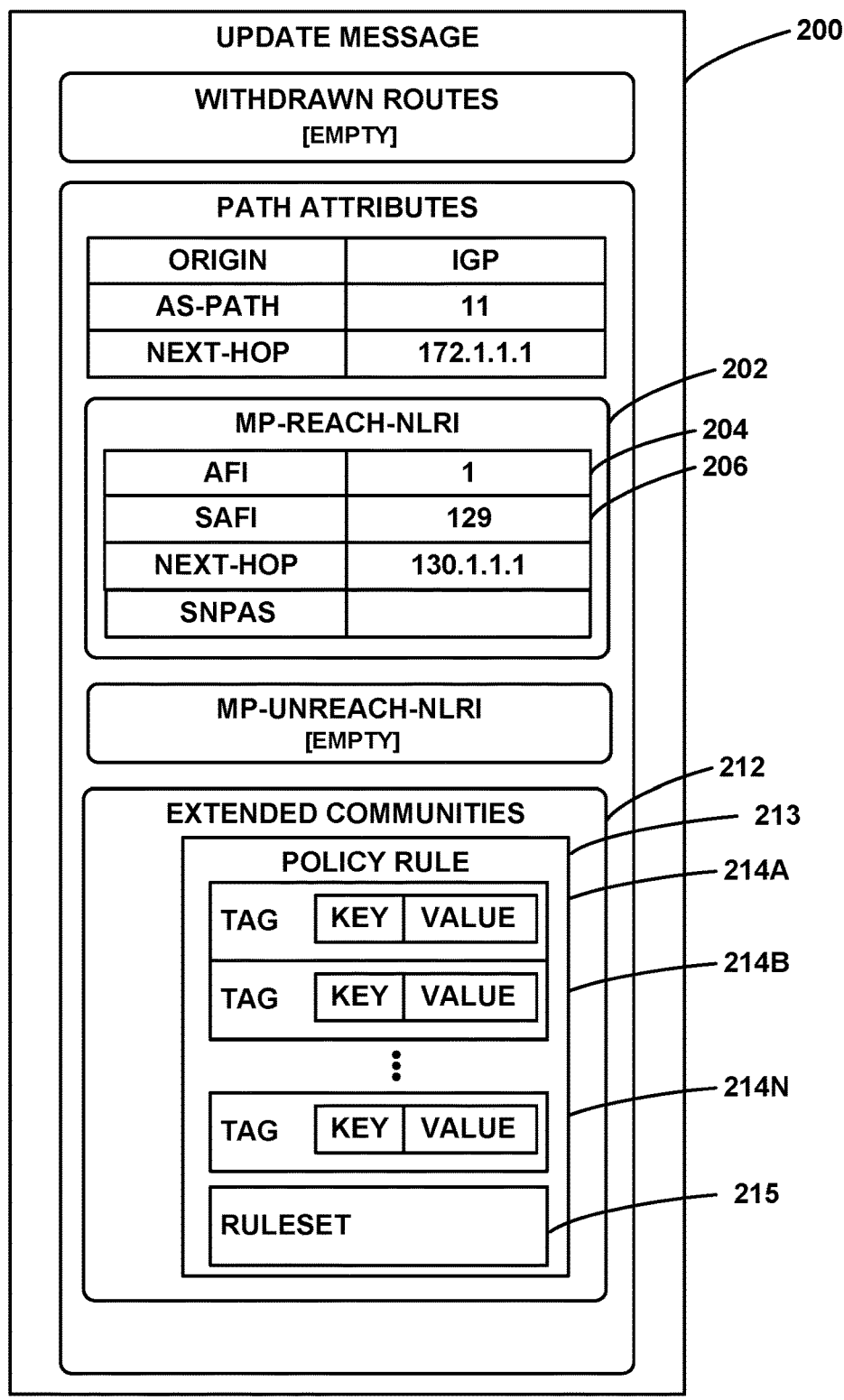
FIG. 5 is a block diagram illustrating an example message that includes tag information in accordance with techniques described herein.

FIG. 5 is a block diagram illustrating an example message that includes tag information in accordance with techniques described herein. Extended BGP UPDATE message 200 conforms to MP-BGP and includes MP-REACH-NLRI 202 advertising a route. For purposes of illustration, extended BGP UPDATE message 200 is illustrated using glyphs, rather than with packet fields.

Extended communities attribute 212 includes field 213 that defines one or more policy rules for application to one or more objects specified by fields 214A-214N (collectively, "tags 214"), which, in turn, define one or more tags comprising base key/value pairs which describe categories to which the tagged objects belong. In some examples, each key of a key/value pair specifies one of an application, a deployment, an application tier, a geographic site, a virtual network, a virtual machine, an interface, a project, a security requirement, a quality requirement, a user, or a compliance requirement, while the corresponding value specifies a descriptor value for the key. For example, a key of a tag 214 may describe a particular category, for example, an "application" tier. Further, a value of the tag may express one or more definitions for the category described by the key, for example, a "development" application tier. In other examples, a key may specify a user, a user role, an operating system, a compute node, a rack, a point of distribution, a network cluster, or a data center.

Furthermore, each policy rule 213 may further include field 215 that describes one or more rulesets for application to traffic among objects described by tags 214. Each ruleset may describe whether to allow or block traffic between the objects described by tags 214. Each ruleset may further describe one or more objects or groups of objects to which each policy rule 213 is applied.

An example schema for policy rule 213 of an extended BGP UPDATE message 200 is provided below:

[Order] [Status] [Action] [Service] [End Point 1] [Direction] [End Point 2] [Match Tags Expression] [Action]

The [Order] field describe the order of application of the policy rule.

The [Status] field indicates to policy agent 139 whether to enable or disable the policy ml. In some examples, the [Status] field is enabled or disabled by an administrator via a user interface of policy agent 139, such as a command-line interface (CLI).

The [Action] field indicates whether to allow or deny traffic that matches objects described by the tags of the policy rule.

The [Service] field may specify a destination protocol, a destination port, or a service group (e.g., a list of ports and protocols) of network traffic to which policy agent 139 should apply the policy rule.

The [End Point 1] and [End Point 2] fields describe objects that share network traffic to which policy agent 139 should apply the policy rule. In some examples, these fields are complex regular expressions that describes multiple objects to which to apply the policy rule. These fields may include information such as a network address prefix, a network address group, a virtual network, one or more expression tags, or a domain name of one or more objects for application of the policy rule.

The [Direction] field may indicate a direction of session initiation for application of the policy rule. Example values for the [Direction] field include ">" (e.g., "left-to-right," sessions where End Point 1 initiates the session with End Point 2), "<" (e.g., "right-to-left," sessions where End Point 2 initiates the session with End Point 1), or "< >" (e.g., "either," sessions where either End Point 1 initiates the session with End Point 2 or End Point 2 initiates the session with End Point 1).

The [Match Tags Expression] field may indicate to policy agent 139 to apply the policy rule to traffic that matches an origin as described with respect to the [End Point 1] field and a destination as described with respect to the [End Point 2] field. In some examples, this action by default matches network traffic within a particular project. In other examples, if a user specifies a match, the default is overridden.

The [Simple Action] field specifies an action to take on network traffic that matches the tags and policy rule. For example, upon determining that network traffic between two or more objects matches the tags specified by the policy rule, the policy rule may specify that that policy agent 139 should log the network traffic, reject the network traffic, permit the network traffic, or issue an alert to an administrator.

In accordance with the foregoing example schema for policy rule 213, example policy rules are described below:

Example 1: allow tcp 80 tier=web > tier=app match deployment && site

In example 1, the policy rule specifies that network traffic that uses TCP protocol on port 80, originates from virtual machine interfaces within a Web tier and is destined for virtual machine interfaces within an Application tier, and that matches both deployment and site tags, should be allowed.

Example 2: allow tcp 3036 tier=app > tier=db match deployment && site

In example 2, the policy rule specifies that network traffic that uses TCP protocol on port 3036, originates from virtual machine interfaces within an Application tier and is destined for virtual machine interfaces within a Database tier, and that matches both deployment and site tags, should be allowed.

Example 3: allow any any any > address-group=legacy-svc

In example 3, the policy rule specifies that network traffic that uses any protocol on any port, with any origin and is destined for virtual machine interfaces within a legacy SVC address group, should be allowed.

Example 4: deny web-service any address-group=blacklist < > any action=log

In example 4, the policy rule specifies that network traffic that uses a web service protocol, originates from addresses within a blacklisted Address Group, and is destined for any virtual machine interface, should be denied. Further, the policy rule specifies that the network traffic should be logged.

In this way, policy controller 23 may distribute new policies to policy agents 139 of respective VN agents 35 of a plurality of data centers 10 via one or more BGP UPDATE messages 200. Further, policy agents 139 may apply the received policies at the interface level so as to express the policies described by tags 214. In this fashion, an administrator may define simplified traffic policies that are scalable and robust across many different types of deployments and execution environments.

Figure 6:
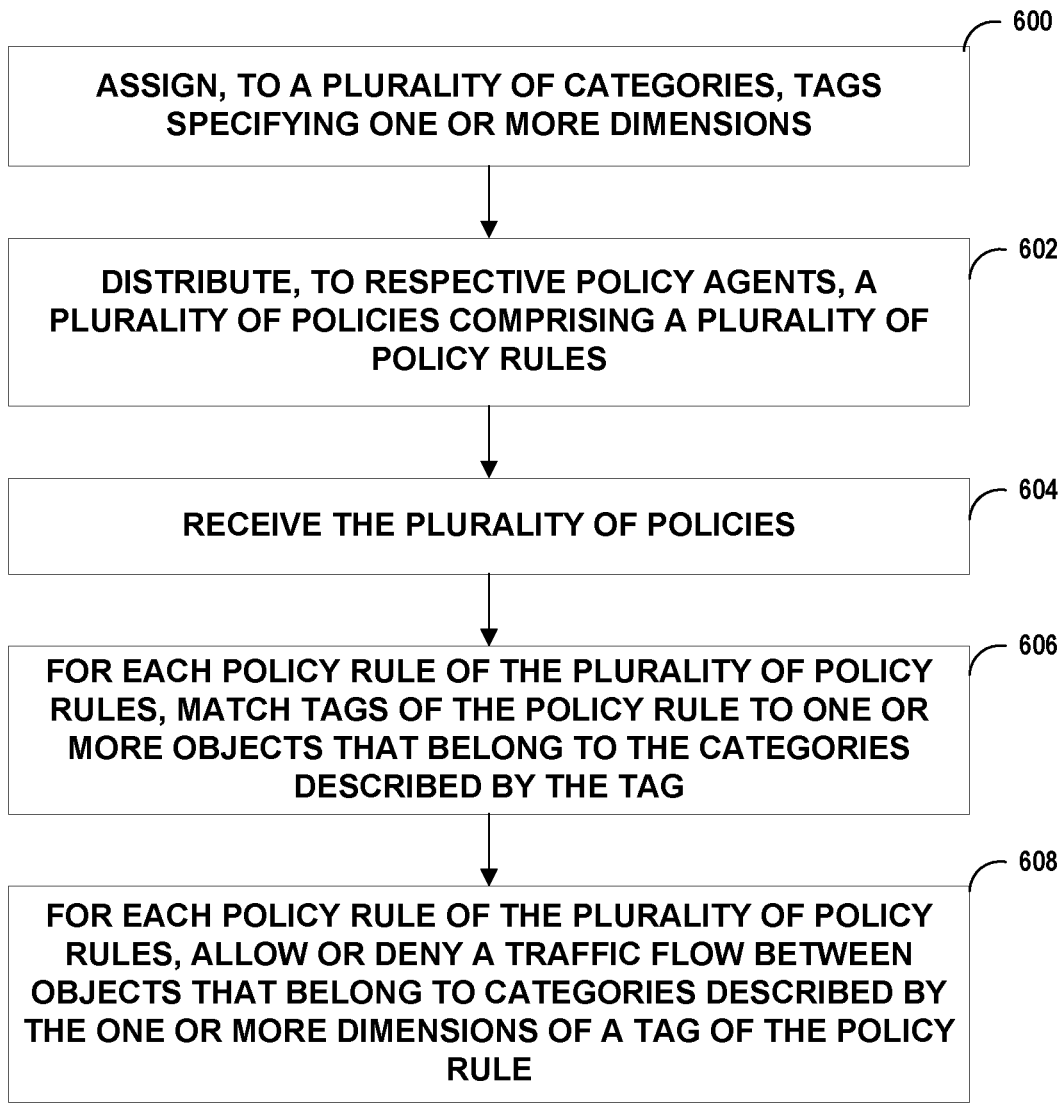
FIG. 6 is a flowchart illustrating an example operation in accordance with the techniques of the disclosure.

FIG. 6 is a flowchart illustrating an example operation in accordance with the techniques of the disclosure. For convenience, FIG. 6 is described with respect to FIGS. 1, 2, and 3.

In the example of FIG. 6, policy controller 23 assigns, to a plurality of categories that support application workloads, tags specifying one or more dimensions of a plurality of dimensions for the application workloads (602). In this example, the application workloads are executed by one or more computing devices, such as servers 12. Further, the one or more computing devices include the plurality of categories. Such categories may include applications, deployments, application tiers, geographic sites, virtual networks, virtual machines, interfaces, projects, security requirements, quality requirements, users, or compliance requirements, for example. Each type of such category represents a dimension for workloads that generate or consume network traffic. In some examples, policy controller 23 assigns tags to objects that execute or otherwise enable workloads with specific dimensions across multiple levels. Example levels of such objects include a global environment level, a project level, a virtual network level, a virtual machine level, and an interface level. In one example, tags map security requirements for the objects.

Policy controller 23 distributes, to respective policy agents 139 of plurality of data centers 10, a plurality of policies (602). Each policy of the plurality of policies includes one or more policy rules. Further, each policy rule of the one or more policy rules specifies one or more tags specifying one or more dimensions of the plurality of dimensions.

Policy agent 139A of data center 10A, for example, receives the plurality of policies (604). For each policy rule of the one or more policy rules, policy agent 139A matches each of the one or more tags of each policy rule of the one or more policy rules to one or more objects that belong to the categories of the plurality of categories described by the one or more dimensions of the tag (606). Further, for each policy rule of the one or more policy rules, policy agent 139A allows or denies a traffic flow between objects that belong to categories of the plurality of categories described by the one or more dimensions of a tag of the policy rule (608).

In some examples, policy agent 139 allows or blocks network traffic at an interface level of VMs 110. In this example, interfaces 146 inherit tags from parent objects, such as VMs 110, virtual networks, parent projects, or global policy sets. 10. Thus, policy agent 139 allows or blocks network traffic destined for or originating from interfaces 146 of VMs 110 by matching tags of one or more policy rules to categories to which interfaces 146 belong.

As one example, policy agent 139 receives, from policy controller 23, a first policy rule that permits network traffic originating from interface 146C and includes tag 1. Policy agent 139 may examine categories applied to interfaces 146, determine that interface 146A belongs to a category described by tag 1 of the first policy rule, and apply the policy rule only to interface 146A. VN agent 35 may subsequently permit network traffic originating from interface 146C and destined for interface 146A.

As another example, policy agent 139 receives, from policy controller 23, a second policy rule that blocks network traffic originating from interface 146C and includes tag 2. Policy agent 139 may examine categories applied to interfaces 146, determine that interface 146B belongs to a category described by tag 2 of the second policy rule, and apply the policy rule only to interface 146B. VN agent 35 may subsequently block network traffic originating from interface 146C and destined for interface 146B.

The techniques described in this disclosure may be implemented, at least in part, in hardware, software, firmware or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

The techniques described in this disclosure may also be embodied or encoded in a computer-readable medium, such as a computer-readable storage medium, containing instructions. Instructions embedded or encoded in a computer-readable storage medium may cause a programmable processor, or other processor, to perform the method, e.g., when the instructions are executed. Computer readable storage media may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer readable media.

Various examples have been described. These and other examples are within the scope of the following claims.

What is claimed is:

1. A method comprising:
  assigning, by a policy controller executing on processing circuitry, first tags to each of a plurality of objects that support application workloads, wherein each of the first tags specifies:
    one or more categories of a plurality of policies; and
    one or more dimensions for the application workloads, wherein each of the one or more dimensions specifies an abstraction level of the respective object of the plurality of objects that support the application workloads,
    wherein one or more computing devices execute the application workloads; and
  distributing, by the policy controller and to respective policy agents of the one or more computing devices, the plurality of policies,
    wherein each policy of the plurality of policies includes one or more policy rules,
    wherein each policy rule of the one or more policy rules specifies one or more second tags specifying the one or more categories of the plurality of policies and the one or more dimensions for the application workloads, and
    wherein each policy rule of the one or more policy rules causes the respective policy agents to allow or deny a traffic flow between objects of the plurality of objects based on the one or more second tags of the policy rule matching the objects of the plurality of objects to which the first tags are assigned.

2. The method of claim 1, wherein the plurality of policies comprise at least one of:
  a plurality of firewall policies;
  a plurality of network policies;
  a plurality of application policies; or
  a plurality of global policies.

3. The method of claim 1, wherein the one or more categories of the plurality of policies include at least one of:
  an environment of the respective application workload within a cloud data center;
  a geographic location of the cloud data center;
  a user of the respective application workload; or
  a compliance requirement for the respective application workload.

4. The method of claim 3, wherein the one or more categories of the plurality of policies include the environment of the respective application workload within the cloud data center, and
  wherein the one or more categories of the plurality of policies further include:
    an application environment of the cloud data center;
    a deployment environment of the cloud data center; or
    a production environment of the cloud data center.

5. The method of claim 1, wherein distributing, to the respective policy agents of the one or more computing devices, the plurality of policies comprises distributing, to the respective policy agents of the one or more computing devices via Border Gateway Protocol (BGP), the plurality of policies.

6. The method of claim 1, wherein each of the one or more dimensions that specify the abstraction level of the respective object of the plurality of objects that support the application workloads specify one or more of:
  an application of the application workloads;
  a deployment of the application workloads;
  an application tier of the application workloads;
  a geographic site of the application workloads;
  a virtual network within which the application workloads execute;
  a virtual machine executing the application workloads;
  an interface of the application workloads;
  a project for the application workloads;
  security requirements for the application workloads;
  quality requirements for the application workloads;
  compliance requirements for the application workloads; or
  users of the application workloads.

7. The method of claim 1, wherein each of the first tags comprises a key and a value pair, the key specifying the one or more categories of the plurality of policies and the value specifying a descriptor for the one or more categories of the plurality of policies.

8. The method of claim 1,
  wherein the first tags that specify the one or more dimensions for the workloads specify a plurality of dimensions for the application workloads, the plurality of dimensions comprising:
    an interface of the application workloads;

a virtual machine executing the application workloads; and a geographic site of the application workloads.

9. The method of claim 1,
wherein the first tags that specify the one or more dimensions for the workloads specify a plurality of dimensions for the application workloads, the plurality of dimensions comprising:
an interface of the application workloads;
a virtual machine executing the application workloads; and
an application of the application workloads.

10. The method of claim 1,
wherein the first tags that specify the one or more dimensions for the workloads specify a plurality of dimensions for the application workloads, the plurality of dimensions comprising:
an application of the application workloads;
a project for the application workloads; and
a geographic site of the application workloads.

11. The method of claim 1,
wherein the first tags that specify the one or more dimensions for the workloads specify a plurality of dimensions for the application workloads, the plurality of dimensions comprising:
a virtual machine executing the application workloads;
a geographic site of the application workloads; and
quality requirements for the application workloads.

12. A method comprising:
receiving, by a policy agent executed by one or more computing devices and from a policy controller, a plurality of policies,
wherein each policy of the plurality of policies includes one or more policy rules,
wherein each policy rule of the one or more policy rules specifies one or more second tags specifying one or more categories of the plurality of policies and one or more dimensions for application workloads executed by the one or more computing devices, and
wherein each of the one or more dimensions specifies an abstraction level of a respective object of a plurality of objects that support the application workloads; and
for each policy rule of the one or more policy rules, allowing or denying, by the policy agent, a traffic flow between objects of the plurality of objects based on the one or more second tags of the policy rule matching the objects of the plurality of objects to which first tags are assigned,
wherein the plurality of objects are assigned the first tags specifying the one or more categories of the plurality of policies and the one or more dimensions for the application workloads.

13. The method of claim 12, wherein the plurality of policies comprise at least one of:
a plurality of firewall policies;
a plurality of network policies;
a plurality of application policies; or
a plurality of global policies.

14. The method of claim 12, wherein the one or more categories of the plurality of policies include at least one of:
an environment of the respective application workload within a cloud data center;
a geographic location of the cloud data center;
a user of the respective application workload; or
a compliance requirement for the respective application workload.

15. The method of claim 14, wherein the one or more categories of the plurality of policies include the environment of the respective application workload within the cloud data center, and
wherein the one or more categories of the plurality of policies further include:
an application environment of the cloud data center;
a deployment environment of the cloud data center; or
a production environment of the cloud data center.

16. The method of claim 12, wherein each of the one or more dimensions that specify the abstraction level of the respective object of the plurality of objects that support the application workloads specify one or more of:
an application of the application workloads;
a deployment of the application workloads;
an application tier of the application workloads;
a geographic site of the application workloads;
a virtual network within which the application workloads execute;
a virtual machine executing the application workloads;
an interface of the application workloads;
a project for the application workloads;
security requirements for the application workloads;
quality requirements for the application workloads;
compliance requirements for the application workloads; or
users of the application workloads.

17. The method of claim 12, further comprising matching, by the policy agent, each tag of the one or more second tags of each policy rule of the one or more policy rules to the objects of the plurality of objects to which the first tags are assigned.

18. The method of claim 12, wherein allowing or denying the traffic flow between the objects of the plurality of objects based on the one or more second tags of the policy rule matching the objects of the plurality of objects to which first tags are assigned comprises:
allowing or denying the traffic flow between interfaces of the objects of the plurality of objects based on the one or more second tags of the policy rule matching the objects of the plurality of objects to which first tags are assigned.

19. A policy controller comprising:
processing circuitry coupled to memory, wherein the policy controller is configured to:
assign first tags to each of a plurality of objects that support application workloads, wherein each of the first tags specifies:
one or more categories of a plurality of policies; and
one or more dimensions for the application workloads, wherein each of the one or more dimensions specifies an abstraction level of the respective object of the plurality of objects that support the application workloads,
wherein one or more computing devices execute the application workloads; and
distribute, to respective policy agents of the one or more computing devices, the plurality of policies,
wherein each policy of the plurality of policies includes one or more policy rules,
wherein each policy rule of the one or more policy rules specifies one or more second tags specifying the one or more categories of the plurality of policies and the one or more dimensions for the application workloads, and
wherein each policy rule of the one or more policy rules causes the respective policy agents to allow or deny a traffic flow between objects of the plurality of objects based on the one or more second tags of the policy rule matching the objects of the plurality of objects to which the first tags are assigned.

20. The policy controller of claim 19, wherein the plurality of policies comprise at least one of:
    a plurality of firewall policies;
    a plurality of network policies;
    a plurality of application policies; or
    a plurality of global policies.

21. The policy controller of claim 19, wherein the one or more categories of the plurality of policies include at least one of:
    an environment of the respective application workload within a cloud data center;
    a geographic location of the cloud data center;
    a user of the respective application workload; or
    a compliance requirement for the respective application workload.

22. The policy controller of claim 21, wherein the one or more categories of the plurality of policies include the environment of the respective application workload within the cloud data center, and
    wherein the one or more categories of the plurality of policies further include:
        an application environment of the cloud data center;
        a deployment environment of the cloud data center; or
        a production environment of the cloud data center.

23. The policy controller of claim 19, wherein, to distribute to the respective policy agents of the one or more computing devices, the plurality of policies, the policy controller is further configured to distribute, to the respective policy agents of the one or more computing devices via Border Gateway Protocol (BGP), the plurality of policies.

24. The policy controller of claim 19, wherein each of the one or more dimensions that specify the abstraction level of the respective object of the plurality of objects that support the application workloads specify one or more of:
    an application of the application workloads;
    a deployment of the application workloads;
    an application tier of the application workloads;
    a geographic site of the application workloads;
    a virtual network within which the application workloads execute;
    a virtual machine executing the application workloads;
    an interface of the application workloads;
    a project for the application workloads;
    security requirements for the application workloads;
    quality requirements for the application workloads;
    compliance requirements for the application workloads; or
    users of the application workloads.

25. One or more computing devices comprising:
    processing circuitry coupled to memory;
    a policy agent configured for execution by the processing circuitry, wherein the policy agent is configured to:
    receive, from a policy controller, a plurality of policies,
        wherein each policy of the plurality of policies includes one or more policy rules,
        wherein each policy rule of the one or more policy rules specifies one or more second tags specifying one or more categories of the plurality of policies and one or more dimensions for application workloads executed by the one or more computing devices, and
        wherein each of the one or more dimensions specifies an abstraction level of a respective object of a plurality of objects that support the application workloads; and
    for each policy rule of the one or more policy rules, allow or deny a traffic flow between objects of the plurality of objects based on the one or more second tags of the policy rule matching the objects of the plurality of objects to which first tags are assigned,
    wherein the plurality of objects are assigned the first tags specifying the one or more categories of the plurality of policies and the one or more dimensions for the application workloads.

26. The one or more computing devices of claim 25, wherein the plurality of policies comprise at least one of:
    a plurality of firewall policies;
    a plurality of network policies;
    a plurality of application policies; or
    a plurality of global policies.

27. The one or more computing devices of claim 25, wherein the one or more categories of the plurality of policies include at least one of:
    an environment of the respective application workload within a cloud data center;
    a geographic location of the cloud data center;
    a user of the respective application workload; or
    a compliance requirement for the respective application workload.

28. The one or more computing devices of claim 27, wherein the one or more categories of the plurality of policies include the environment of the respective application workload within the cloud data center, and
    wherein the one or more categories of the plurality of policies further include:
        an application environment of the cloud data center;
        a deployment environment of the cloud data center; or
        a production environment of the cloud data center.

29. The one or more computing devices of claim 25, wherein each of the one or more dimensions that specify the abstraction level of the respective object of the plurality of objects that support the application workloads specify one or more of:
    an application of the application workloads;
    a deployment of the application workloads;
    an application tier of the application workloads;
    a geographic site of the application workloads;
    a virtual network within which the application workloads execute;
    a virtual machine executing the application workloads;
    an interface of the application workloads;
    a project for the application workloads;
    security requirements for the application workloads;
    quality requirements for the application workloads;
    compliance requirements for the application workloads; or
    users of the application workloads.

30. The one or more computing devices of claim 25, wherein the policy agent is further configured to match each tag of the one or more second tags of each policy rule of the one or more policy rules to the objects of the plurality of objects to which the first tags are assigned.

31. The one or more computing devices of claim 25, wherein, to allow or deny the traffic flow between the objects of the plurality of objects based on the one or more second tags of the policy rule matching the objects of the plurality of objects to which first tags are assigned, the policy agent is configured to:

allow or deny the traffic flow between interfaces of the objects of the plurality of objects based on the one or more second tags of the policy rule matching the objects of the plurality of objects to which first tags are assigned.

\* \* \* \* \*